Jan. 17, 1933.  C. C. WESTERMAN ET AL  1,894,505
VALVE
Filed April 15, 1929   2 Sheets-Sheet 1

C. C. Westerman
G. L. Westerman, Inventors
By C. A. Snow & Co.
Attorneys.

Jan. 17, 1933.   C. C. WESTERMAN ET AL   1,894,505
VALVE
Filed April 15, 1929   2 Sheets-Sheet 2

C. C. Westerman,
G. L. Westerman, Inventors
By C. A. Snow & Co.
Attorneys.

Patented Jan. 17, 1933

1,894,505

UNITED STATES PATENT OFFICE

CLAUDE C. WESTERMAN AND GUY L. WESTERMAN, OF BREMEN, OHIO

VALVE

Application filed April 15, 1929. Serial No. 355,192.

This invention relates to a valve for use in connection with different kinds of automatic appliances such as oil and gas separators, oil and gas regulators, and as a control valve for maintaining the liquid level in tanks, boilers, etc.

It is an object of the invention to provide a "semi-balanced" valve which will act automatically to relieve excessive pressure within the structure to which the valve is connected.

Another object is to provide a valve of this type which will not "freeze" or become affixed to its seat.

A further object is to provide the valve with means whereby a predetermined pressure can be maintained, said means being adjustable.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings, the preferred form of the invention has been shown.

In said drawings.

Figure 1:
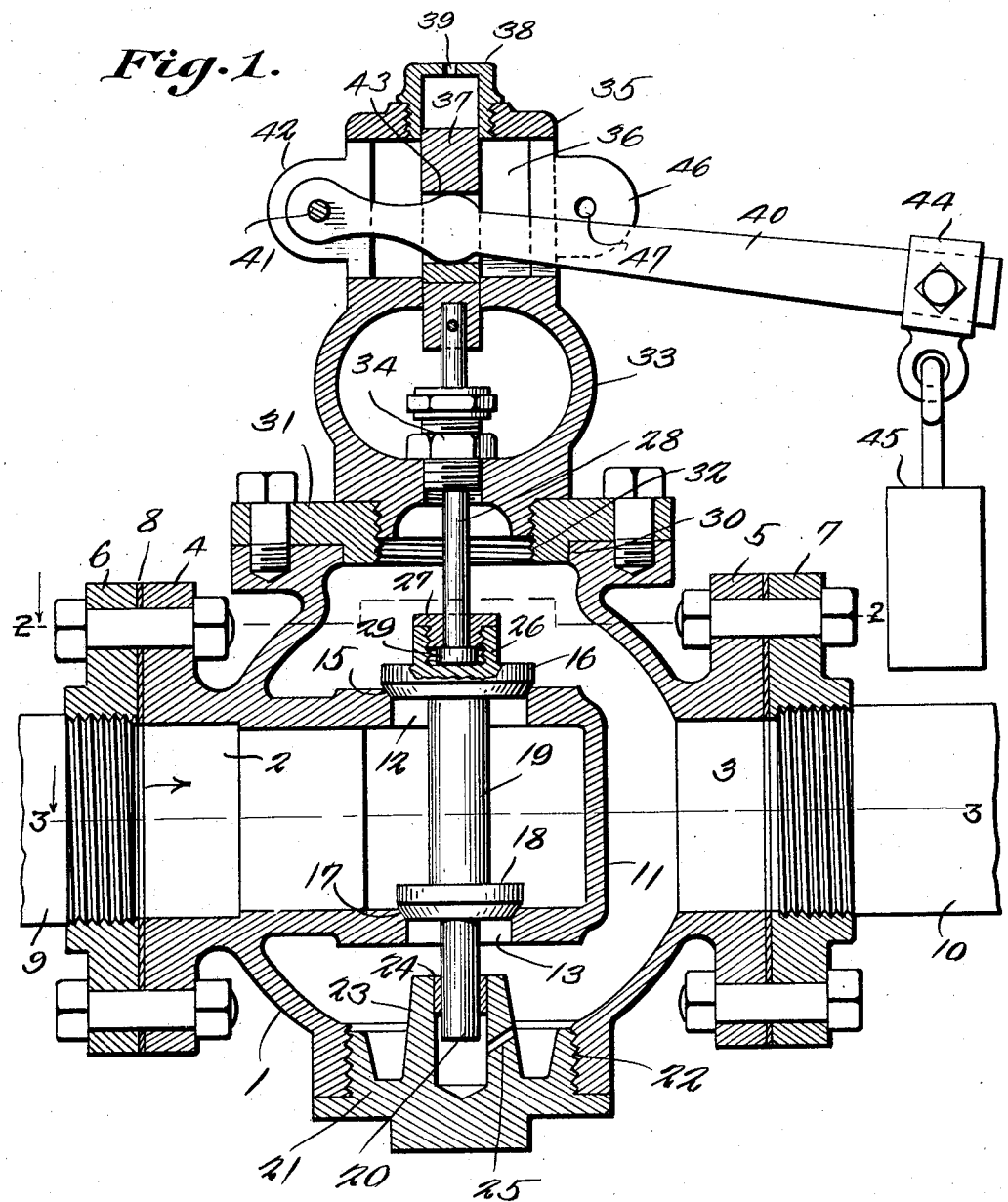
Figure 1 is a view partly in section and partly in elevation showing the construction of the valve in its casing.
Figure 2:
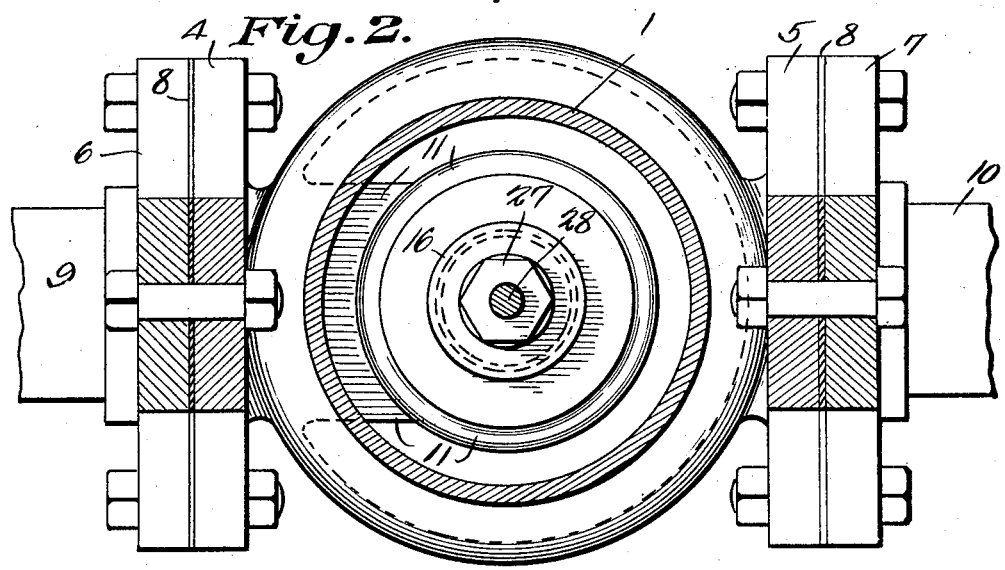
Figure 2 is a section on line 2—2, Figure 1.
Figure 3:
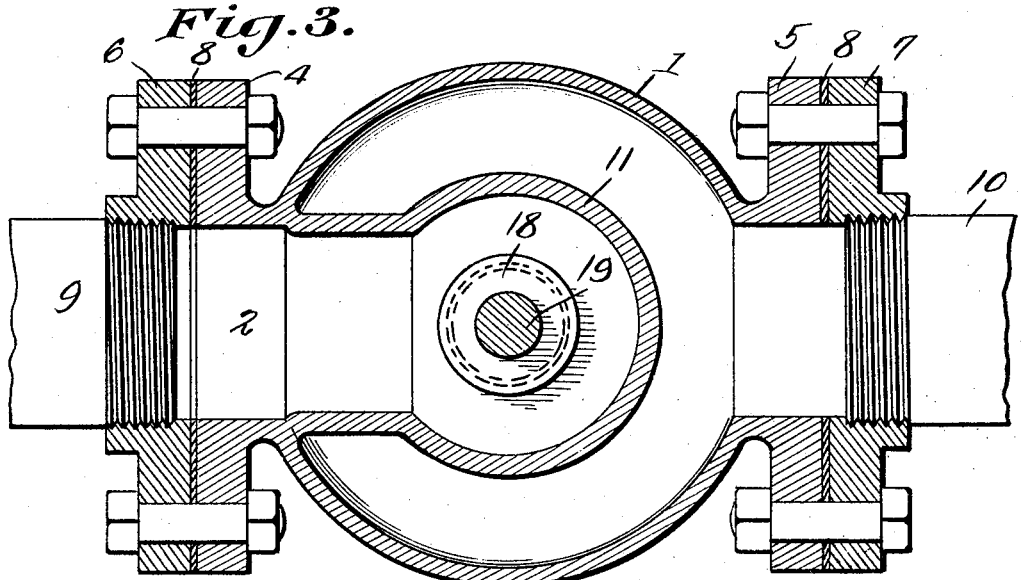
Figure 3 is a section on line 3—3, Figure 1.
Figure 4:
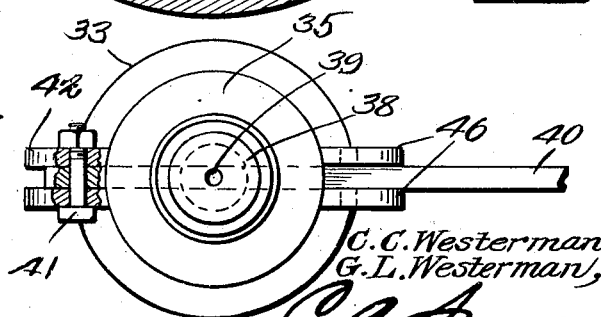
Figure 4 is a plan view of the bonnet of the valve.

Referring to the figures by characters of reference, 1 designates a valve casing having an inlet 2 and an outlet 3 both surrounded by flanges 4 and 5 respectively to which are bolted coupling rings 6 and 7, the joints between these rings and the flanges being sealed by washers 8 or the like. Ring 6 is adapted to be engaged by an inlet pipe 9 while ring 7 engages an outlet pipe 10.

An inlet housing 11 is formed integral with the casing 1 and is in constant communication with the inlet 2. This housing has an outlet port 12 in the top thereof and a smaller outlet port 13 in its bottom. The wall of the port 12 is flared to provide a seat 15 for a valve head 16 while the wall of port 13 is flared to provide a seat 17 for a valve head 18. The valve heads are connected by a spindle 19 and extending from the head 18 and through port 13 is a guide stem 20. A screw plug 21 closes an opening 22 in the bottom of the valve casing 1 and has a tubular extension 23 into which the stem 20 extends, there being a bearing sleeve 24 in the extension 23 slidably engaged by the stem 20. A vent 25 opens from the interior of the extension 23 to the outlet side of the valve casing.

A recessed extension 26 is formed on the valve head 16 and receives a screw plug 27. In this plug is mounted an operating stem 28 having a head 29 swiveled in the recessed extension 26 and held assembled with the valve head 16 by the plug 27.

Valve casing 1 has an opening 30 opposite the opening 22 and extending over this opening is a cover plate 31 secured in place in any manner desired. This cover plate has a threaded opening 32. A bonnet 33 is screwed into the opening 32 and has a suitably packed bearing 34 in which the operating stem 28 is mounted to slide.

Extending upwardly from the bonnet is a head 35 having a slot extending therethrough intersected by a slide 37. The lower end of this slide is connected to the upper end of the operating stem 28 and mounted to reciprocate within the lower portion of the head 35. The upper end of this slide reciprocates in a hollow plug 38 removably seated in the top of the head and provided with a vent 39.

A lever 40 is fulcrumed at 41 between ears 42 extending from the head and this lever is extended through an opening 43 formed in the slide 37. Adjustably mounted on the free end of the lever is a collar 44 from which hangs a weight 45. Ears 46 may be extended from the head, these ears being provided with openings 47 for the reception of suitable fastening means which, when extended over lever 40, will hold the valve against operation.

It will be understood that the valve heads 16 and 18 will remain closed until the pressure directed thereagainst from the inlet port reaches a predetermined point. At that time the pressure upwardly against the larger exposed area of the valve head 16 will be sufficient to offset the downward pressure on the smaller valve head 18. Consequently the valve head will be opened, thrusting through stem 28 against the slide 37 and causing lever 40 to lift the weight 45. When pressure is relieved the weighted lever 40 will thrust downwardly through slide 37 and stem 28 against the valve in casing 1, causing the two heads 16 and 18 to move against their seats and shut off the flow from the inlet 2 to the outlet 3.

What is claimed is:

The combination with a casing and a valve therein, of a stem extending from and having a swivel connection with the valve, a slotted guide member removably engaging and closing the casing, said stem being extended through and guided by said member, a slide mounted in the guide member and intersecting the slot, said slide being connected to the swiveled stem, ears at opposite ends of the slot in the guide, a lever extending through the slide and slot and pivotally mounted at one end in the ears at one end of the slot, the ears at the other end of the slot being apertured for the reception of lever fastening means, and a weight for controlling the actuation of the lever and slide and holding the valve normally in one position and the lever normally below the fastener receiving apertures.

In testimony that we claim the foregoing as our own, we have hereto affixed our signatures.

CLAUDE C. WESTERMAN.
GUY L. WESTERMAN.